Jan. 10, 1967  C. R. EDWARDS  3,297,142
HAY BALE LOADING DEVICE
Filed Nov. 12, 1964  2 Sheets-Sheet 1
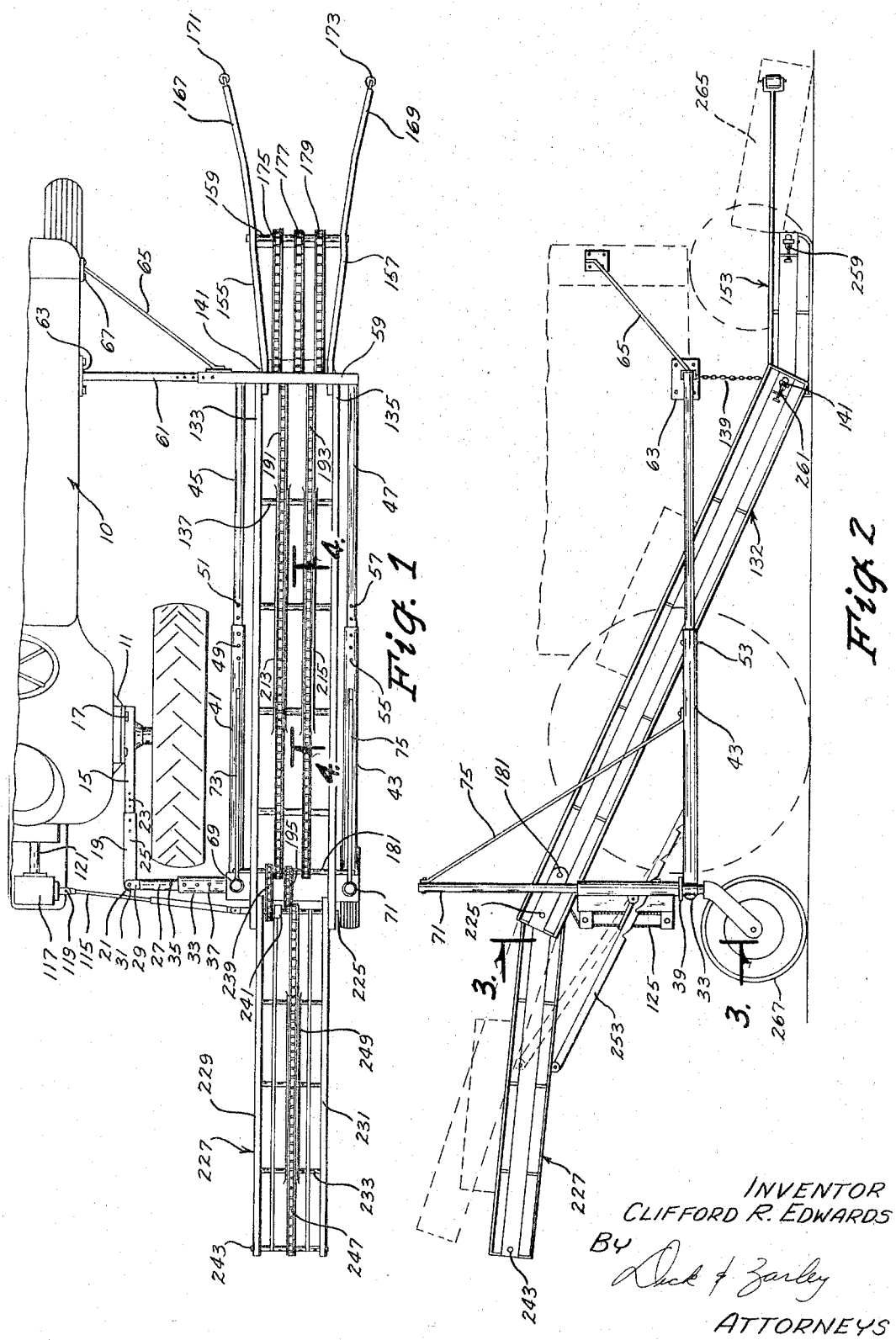
INVENTOR
CLIFFORD R. EDWARDS
BY
ATTORNEYS

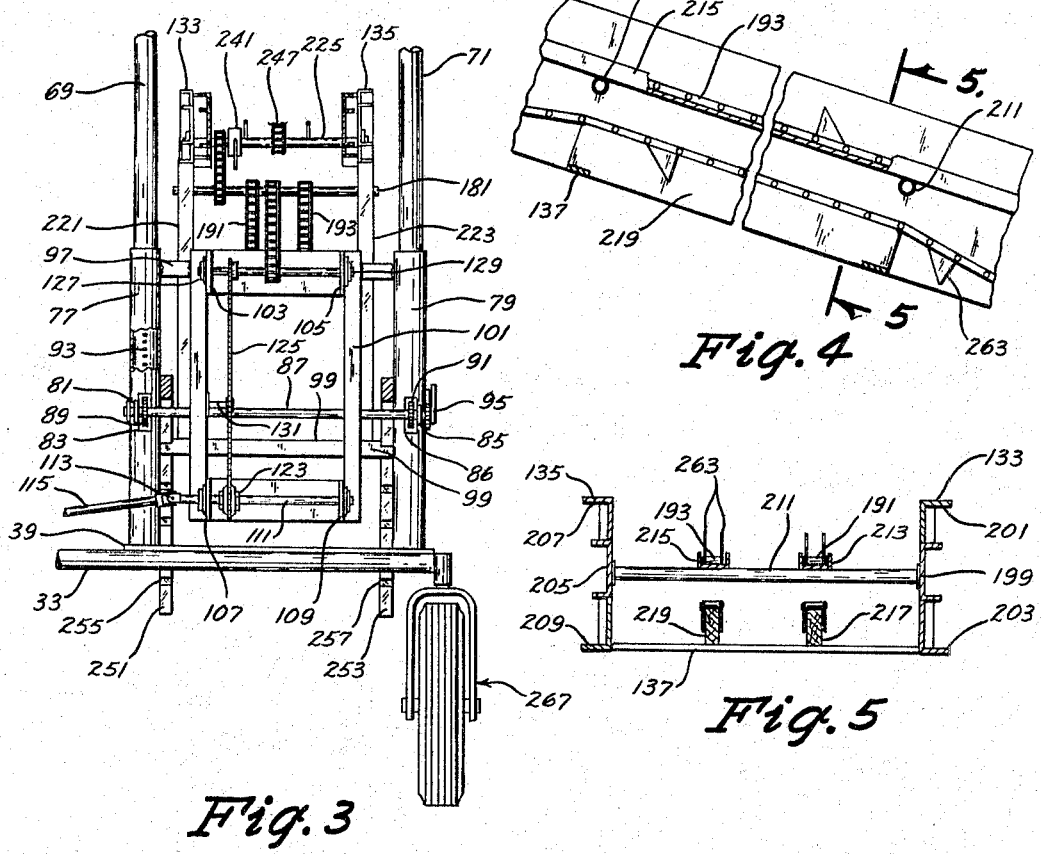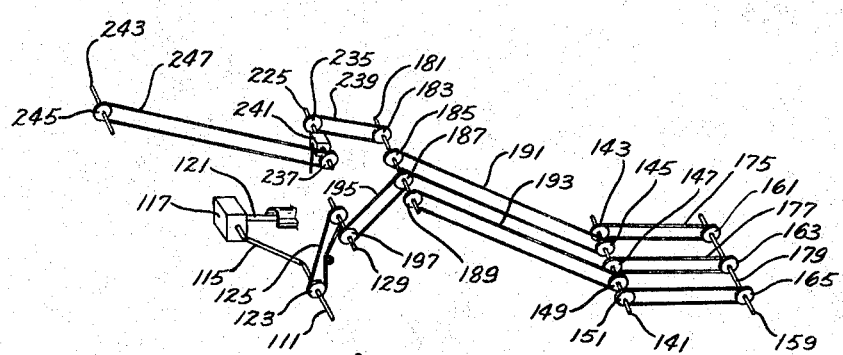

United States Patent Office 3,297,142
Patented Jan. 10, 1967

3,297,142
HAY BALE LOADING DEVICE
Clifford R. Edwards, Russell, Iowa 50238
Filed Nov. 12, 1964, Ser. No. 410,679
2 Claims. (Cl. 198—117)

This invention relates to a hay bale loading device and more particularly to a hay bale loading device which is detachably mounted on one side of a tractor.

It is a principal object of this invention to provide a hay bale loading device which is detachably mounted on a tractor.

A further object of this invention is to provide a tractor mounted hay bale loading device which is adapted to be mounted on various sizes of tractors.

A further object of this invention is to provide a tractor mounted hay bale loading device which has a pick up means mounted on its forward end.

A further object of this invention is to provide a tractor mounted hay bale loading device which is operated by the tractor power take-off unit.

A further object of this invention is to provide a tractor mounted hay bale loading device which may be used to convey hay bales to a wagon being pulled by the moving tractor or which may be used in a stationary position to convey hay bales to a hay bale stack.

A further object of this invention is to provide a tractor mounted hay bale loading device which may be adjustably raised or lowered as required.

A further object of this invention is to provide a hay bale loading device which has a rear conveyor member selectively pivotally connected at its forward end to the rearward end of a forward conveyor member.

A still further object of this invention is to provide a hay bale loading device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary top plan view of the device secured to a tractor;

FIG. 2 is a side view of the device illustrating hay bales being conveyed on the device and also illustrating the pivotal movement of the rearward conveyor member;

FIG. 3 is a sectional view of the device seen on line 3—3 of FIG. 2 at an enlarged scale;

FIG. 4 is a sectional view of the device seen on line 4—4 of FIG. 1 at an enlarged scale with portions thereof cut away to more fully illustrate the invention;

FIG. 5 is a sectional view of the device seen on line 5—5 of FIG. 4; and

FIG. 6 is a schematic drawing illustrating the arrangement of the various pulleys and chains.

The numeral 10 generally indicates a tractor having a rearward frame portion 11 and a forward frame portion 13. A pipe 15 is secured at its forward end to the rearward frame portion 11 by bolt 17 and extends substantially horizontally rearwardly therefrom as seen in FIG. 1. Adjustably telescopically embracing pipe 15 is a pipe 19 extending rearwardly therefrom and having a clevis element 21 mounted on its rearward end. Pipe 15 is provided with a plurality of holes 23 along its length while pipe 19 is provided with a plurality of holes 25 which register with holes 23 in pipe 15. A pin member (not shown) extends through register holes in pipe 15 and pipe 19 to effect the telescopic connection therebetween.

Pipe 27 having a clevis element 29 mounted on one end thereof is pivotally connected to clevis element 21 by means of pin 31 extending therethrough. Pipe 27 extends horizontally outwardly from pipe 19 and is received by a pipe 33 as seen in FIG. 1. Pipe 33 adjustably slidably embraces pipe 27 and extends outwardly therefrom as seen in FIG. 1. Pipes 27 and 33 are telescopically connected by means of a pin member (not shown) extending through one of the plurality of registering holes 35 and 37 in pipes 27 and 33 respectively.

An elongated flat plate 39 is secured to the upper surface of pipe 33 by welding or the like for a portion of the length thereof as seen in FIG. 3. A pair of elongated spaced apart pipes 41 and 43 are secured to the forward side of pipe 33 below plate 39 by means of welding or the like and extend substantially horizontally forwardly therefrom at a right angle to pipe 33. As seen in FIG. 1, a pair of pipes 45 and 47 are telescopically received by the forward ends of pipes 41 and 43 respectively. The telescopic connection between pipes 41 and 45 is effected by means of a pin member (not shown) extending through one of the plurality of holes 49 in pipe 41 and through one of the plurality of registering holes 51 in pipe 45. The telescopic connection between pipes 43 and 47 is effected by means of pin member 53 extending through one of the plurality of holes 55 in pipe 43 and through one of the plurality of registering holes 57 in pipe 47.

A pipe 59 is secured to the forward ends of pipes 45 and 47 and extends substantially horizontally towards tractor 10 and telescopically receives one end of pipe 61 which has its other end secured to the forward frame portion 13 of tractor 10 by means of bolts 63. A cross brace 65 has one of its ends secured to pipe 59 by means of welding or the like and has its other end secured to forward frame portion 13 of tractor 10 by means of bolts 67.

A pair of spaced apart pipes 69 and 71 have their lower ends secured to plate 39 by means of welding or the like and extend vertically upwardly therefrom as seen in FIGS. 1, 2 and 3. A brace 73 is secured to the upper end of pipe 69 by any convenient means and extends downwardly and forwardly to pipe 41 where it is secured thereto by any convenient means. A brace 75 is secured to the upper end of pipe 71 by any convenient means and extends downwardly and forwardly to pipe 43 where it is secured thereto by any convenient means.

As seen in FIG. 3, pipes 77 and 79 slidably embrace pipes 69 and 71 respectively. Pipe 77 is provided with an ear member 81 secured to the rearward side thereof by welding or the like and has a slot 83 formed therein adjacent ear member 81. Pipe 79 is provided with an ear member 85 secured to the rearward side thereof by welding or the like and has a slot 86 formed therein adjacent ear member 85.

A shaft 87 is rotatably mounted in ear members 81 and 85 and extends therebetween as seen in FIG. 3 and has gear wheels 89 and 91 mounted thereon which extend through slots 83 and 86 respectively. The inner portion of gear wheel 89 engages holes 93 in pipe 69. The inner portion of gear wheel 91 engages holes (not shown) in pipe 71. The outer end of shaft 87 is provided with a ratchet means 95 to effect the rotation of shaft 87 in conventional fashion. As shaft 87 is rotated by ratchet means 95, gear wheels 89 and 91 being in engagement with the holes in pipe 69 and 71 respectively cause pipes 77 and 79 to vertically slidably move on pipes 69 and 71.

Spaced apart arm members 97 and 99 are secured to pipes 77 and 79 by means of welding or the like and extended therebetween as seen in FIG. 3. A frame 101 is secured to arm members 97 and 99 in any convenient manner and extends therebetween as seen in FIG. 3.

Frame 101 includes spaced apart ear members 103 and 105 extending rearwardly adjacent the upper end thereof and spaced apart ear members 107 and 109 extending rearwardly adjacent the lower end thereof.

A shaft 111 is rotatably mounted in and extends between ear members 107 and 109 and is connected at its inner end by a universal joint 113 to telescopic drive shaft 115. Drive shaft 115 is connected to a gear box 117 by means of universal joint 119. Gear box 117 is connected to the tractor power take-off unit by means of shaft 121 extending therebetween.

A conventional slip clutch drive sprocket 123 is mounted on shaft 111 and has a roller chain 125 extending therearound. Roller chain 125 extends around sprocket 127 mounted on shaft 129 which is rotatably mounted in and extends between ear members 103 and 105. A conventional chain tightener 131 is secured to frame 101 and engages roller chain 125 as seen in FIG. 3.

An elongated conveyor 132 comprised of opposite sides 133 and 135 having support bars 137 extending therebetween has its forward end suspended above the ground by means of chain 139 extending downwardly from pipe 59 as seen in FIG. 1 and 2.

Conveyor 132 has a shaft 141 rotatably mounted in its forward end extending between opposite sides 133 and 135 and has spaced apart sprockets 143, 145, 147, 149 and 151 mounted thereon. A pick-up means 153 is pivotally mounted on the forward end of conveyor 132 and is comprised of opposite sides 155 and 157 having a shaft 159 rotatably mounted in and extending therebetween at their forward ends. Shaft 159 has spaced apart sprockets 161, 163 and 165 mounted thereon.

The upper ends of sides 155 and 157 extend forwardly and outwardly from pick-up means 153 as seen in FIG. 1 and 2 to form bale guides 167 and 169 respectfully having rollers 171 and 173 vertically rotatably mounted on the forward ends thereof respectively.

It should be noted that shaft 141 on conveyor 132 also extends through sides 155 and 157 of pick-up means 153 to effect the pivotal connection therebetween. Pick-up chain 175 extends around and between sprockets 143 and 161. Pick-up chain 177 extends around and between sprockets 147 and 163. Pick-up chain 179 extends around and between sprockets 151 and 165.

The upper end of conveyor 132 is provided with a shaft 181 rotatably mounted in and extending between sides 133 and 135 and has spaced apart sprockets 183, 185, 187 and 189 mounted thereon. Chain 191 extends around and between sprockets 185 and 145. Chain 193 extends around and between sprockets 189 and 149. A chain 195 extends around and between sprocket 187 on shaft 181 and sprocket 197 mounted on shaft 129 as seen in FIGS. 3 and 6.

As seen in FIG. 5, side 133 of conveyor 132 is comprised of a channel member 199 having angle members 201 and 203 secured to its upper and lower edges respectively by welding or the like. Side 135 of conveyor 132 is comprised of channel member 205 having angle members 207 and 209 secured to its upper and lower edges respectively by welding or the like. A plurality of support bars 211 are secured to and extend between channel members 199 and 205 along the length of conveyor 132.

Channel shaped chain guides 213 and 215 are secured to the upper surface of support bars 211 for a portion of the length of conveyor 132 by means of welding or the like and provide a guide for chains 191 and 193 respectively. As seen in FIGS. 4 and 5, return guides 217 and 219 are secured to the upper surface of support bars 137 by any convenient means for a portion of the length of conveyor 132 and receive chains 191 and 193 respectively.

A pair of spaced apart support braces 221 and 223 are secured to arm members 97 and 99 by welding or the like and extend upwardly therefrom as seen in FIG. 3. Shaft 181 is rotatably mounted at its ends in the upper ends of braces 221 and 223.

As seen in FIGS. 1 and 2, a rotatable shaft 225 extends between sides 133 and 135 of conveyor 132 at its rearward end. A conveyor means 227 having opposite sides 229 and 231 with support bars 233 extending therebetween is pivotally connected to the rearward end of conveyor 132 by means of shaft 225 extending through sides 229 and 231 as seen in FIG. 1. Shaft 225 has spaced apart sprockets 235 and 237 mounted thereon. A chain 239 extends around and between sprocket 235 and sprocket 183 on shaft 181. A throw-out clutch 241 is operatively mounted on shaft 225 and is adapted to disengage sprocket 237 at times.

As seen in FIG. 1, 2 and 6, a shaft 243 is rotatably mounted in and extends between sides 229 and 231 of conveyor 227. Mounted on shaft 243 is a sprocket 245. A chain 247 extends around and between sprockets 245 and 237. Conveyor 227 is provided with a channel shaped chain guide 249 as seen in FIG. 1.

Pivotally secured to the bottom side of conveyor 227 are spaced apart braces 251 and 253 having a plurality of notches 255 and 257 formed therein respectively along a portion of their length. The notches are adapted to engage arm member 99 as seen in FIG. 3 to vary the angle between conveyor 227 and conveyor 132.

As seen in FIG. 2, chain tighteners 259 and 261 are secured to pick-up means 153.

Chains 175, 177, 179, 191, 193, 239 and 247 are provided with a plurality of upstanding teeth 263 which are adapted to engage the bales 265 to convey the same.

The numeral 267 designates a rotatable wheel assembly pivotally connected to the outer end of pipe 33 as seen in FIGS. 2 and 3.

The normal method of operation is as follows. The device is quickly mounted on tractor 10 as previously described. It can be appreciated that the device could be adapted to be mounted on either side of a tractor with very little fabrication. The various telescoping pipe members permit the device to be used on a variety of different tractors regardless of their sizes.

When it is desired to pick up the hay bales in a field, it is simply necessary to drive the tractor in a fashion so that the hay bale will be caused to pass between guides 167 and 169. Rollers 171 and 173 serve to aid in guiding the bales into the forward end of pick-up means 153.

Teeth 263 on chains 175, 177 and 179 dig into the hay bale and permit the respective chains to convey the hay bales rearwardly. The pivotal connection between pick-up means 153 and conveyor 132 allow pick-up means 153 to "float" over the ground surface. Chain 139 prevents conveyor 132 from undesirable downward movement while permitting the forward end of conveyor 132 to move upwardly should the need arise. The hay bale 265 would be elevated up conveyor 132 by means of chains 191 and 193 and caused to be deposited on conveyor 227. Conveyor 227 conveys the hay bale 265 rearwardly where the bale would pass from the rearward end thereof. A wagon is usually pulled behind tractor 10 and the bale would be deposited in this wagon. The rearward end of conveyor 227 may be raised or lowered with respect to conveyor 132 by means of braces 251 and 253 as previously described to permit the device to be adjusted to the desired height.

The rearward end of conveyor 132 may also be raised or lowered by means of ratchet means 95 as previously described.

Slip clutch 123 prevents damage to the device should a part thereof become jammed. Throw-out clutch 241 permits sprocket 237 and thus chain 247 to be disengaged without disengaging the remaining parts of the device. This is especially convenient when the tractor is turning a corner. The rearward end of conveyor 227 would not be over the trailing wagon during the turning operation. Thus, the bales would pass from the rearward end of conveyor 227 to the ground. Therefore, throw-out clutch 241 is activated while the tractor manipulates the corner. The bales are continued to be picked up and once the rearward end of conveyor 227 is over the wagon again, throw-out clutch 241 is disengaged.

The device works equally well in a stationary position for conveying hay bales to a haystack. The device is simply operated by the tractor power-take off as during the before described operation. The rearward end of conveyor 132 may be raised as the height of the haystack increases. The rearward end of conveyor 227 may be raised or lowered with respect to conveyor 132 as desired in the manner previously described.

Thus, from the foregoing it can be seen that the device accomplishes at least all of its stated objectives.

Some changes may be made in the construction and arrangement of my hay bale loading device without departing from the real spirit and purpose of my invention, and it is my intention to cover by my claims, any modified forms of structure or use of mechanical equivalents which may be reasonably included within their scope.

I claim:
1. In combination with a tractor,
   a supporting frame operatively secured to said tractor at one side thereof, said supporting frame comprised of first and second spaced apart telescopic arm means substantially parallel to the longitudinal axis of said tractor, a third telescopic arm means secured to the forward ends of said first and second telescopic arm means and extending transversely therefrom towards said tractor, said third telescopic arm means being secured to said tractor, a fourth telescopic arm means secured to the rearward ends of said first and second telescopic arm means and extending transversely therefrom towards said tractor and being operatively secured thereto,
   an elongated conveyor means mounted on said supporting frame having its longitudinal axis substantially parallel to the longitudinal axis of said tractor, said conveyor means being adapted to receive a hay bale at its forward end and move said hay bale rearwardly and upwardly therefrom.
2. The combination of claim 1 wherein a fifth telescopic arm means is secured to the inner end of said fourth telescopic arm means and extends transversely therefrom and is secured to said tractor.

References Cited by the Examiner
UNITED STATES PATENTS

| | | | |
|---|---|---|---|
| 1,603,634 | 10/1926 | Nelson | 198—92 |
| 2,174,605 | 10/1939 | Spencer. | |
| 2,354,360 | 7/1944 | Bigelow | 198—92 X |
| 2,442,267 | 5/1948 | Eksergian. | |
| 2,519,478 | 8/1950 | King | 198—122 |
| 2,593,023 | 4/1952 | Haase | 198—233 X |
| 2,594,221 | 4/1952 | Ryan. | |
| 2,624,415 | 1/1953 | Moore | 198—11 X |
| 2,722,129 | 11/1955 | Randolph | 198—233 X |
| 2,883,030 | 4/1959 | Saunders. | |

ANDRES H. NIELSEN, *Primary Examiner.*

EDWARD A. SROKA, EVON C. BLUNK, *Examiners.*